US006735623B1

(12) United States Patent
Prust

(10) Patent No.: US 6,735,623 B1
(45) Date of Patent: May 11, 2004

(54) METHOD AND SYSTEM FOR ACCESSING A REMOTE STORAGE AREA

(75) Inventor: Mitch Prust, 16244 Ramsey Blvd. NW., Ramsey, MN (US) 55303

(73) Assignee: Mitch Prust, Saint Paul, MN (US)

( * ) Notice: Subject to any disclaimer, the term of this patent is extended or adjusted under 35 U.S.C. 154(b) by 0 days.

(21) Appl. No.: 09/501,039

(22) Filed: Feb. 9, 2000

(51) Int. Cl.⁷ ............................................... G06F 15/16
(52) U.S. Cl. ....................................... 709/219; 709/206
(58) Field of Search ................................ 709/206, 201, 709/217–219, 207, 203; 707/1, 10, 201

(56) References Cited

U.S. PATENT DOCUMENTS

| | | | | |
|---|---|---|---|---|
| 5,659,746 A | * | 8/1997 | Bankert et al. ............. | 707/205 |
| 5,748,896 A | | 5/1998 | Daly et al. | |
| 5,937,160 A | * | 8/1999 | Davis et al. ................ | 709/203 |
| 6,018,774 A | * | 1/2000 | Mayle et al. ............... | 709/250 |
| 6,044,205 A | * | 3/2000 | Reed et al. ................. | 709/201 |
| 6,072,982 A | * | 6/2000 | Haddad ....................... | 725/93 |
| 6,216,168 B1 | | 4/2001 | Dev et al. | |
| 6,256,666 B1 | * | 7/2001 | Singhal ...................... | 709/217 |
| 6,289,382 B1 | | 9/2001 | Bowman-Amuah | |
| 6,308,164 B1 | * | 10/2001 | Nummelin et al. ........... | 705/9 |
| 6,311,213 B2 | | 10/2001 | Dawson et al. | |
| 6,327,608 B1 | * | 12/2001 | Dillingham ................. | 709/203 |
| 6,356,863 B1 | | 3/2002 | Sayle | |
| 6,356,941 B1 | | 3/2002 | Cohen | |
| 6,363,384 B1 | | 3/2002 | Cookmeyer, II et al. | |
| 6,366,987 B1 | | 4/2002 | Tzelnic et al. | |
| 6,393,466 B1 | | 5/2002 | Hickman et al. | |
| 6,397,261 B1 | * | 5/2002 | Eldridge et al. ............ | 709/217 |
| 6,424,996 B1 | * | 7/2002 | Killcommons et al. ..... | 709/206 |
| 6,449,688 B1 | | 9/2002 | Peters et al. | |
| 6,453,325 B1 | | 9/2002 | Cabrera et al. | |
| 6,466,978 B1 | | 10/2002 | Mukherjee et al. | |
| 6,519,612 B1 | * | 2/2003 | Howard et al. ............. | 707/200 |

FOREIGN PATENT DOCUMENTS

| | | |
|---|---|---|
| EP | 0881587 A2 | 12/1998 |
| EP | 0881587 A3 | 6/2002 |
| WO | WO 94/18634 | 8/1994 |
| WO | WO 98/24025 | 6/1998 |

OTHER PUBLICATIONS

"Client Application for Integrating a Development Environment with a Web Distributed Authoring (WEBDAV) Server", Research Disclosure, Kenneth mason Publications, Hampshire, GB, NR. 420, Page(s) 578–579, XP000888651, ISSN: 0374–4353, Apr. 1999.

Goals for a configuration management network protocol, Whitehead, E.J., System Configuration Management, 9$^{th}$ International Symposium. SCM–9, Proceedings, Toulouse, France Sep. 5–7, 1999, ISBN: 3–540–66484–X, 18 pages.

WebDAV: A Panacea for Collaborative Authoring?, Sussman, D., Siemens Corporate Research, Apr.–Jun. 1999, pp. 76–79.

(List continued on next page.)

*Primary Examiner*—David Wiley
*Assistant Examiner*—Joseph E. Avellino
(74) *Attorney, Agent, or Firm*—Shumaker & Sieffert, P.A.

(57) ABSTRACT

A data storage system is described that provides seamless access to remote data storage areas via a global computer network. The data storage system includes one or more storage servers coupled to one or more storage devices. The storage devices provide a plurality of virtual storage areas, where each virtual storage area is assigned to a user. Access to the virtual storage areas is fully integrated with an operating system executing on a client computer such that the user, or software applications executing on the client computer, can seamlessly access the corresponding virtual storage area using standard file management routines provided by the operating system. In addition, the invention provides a wide range of other remote access methods to the virtual data storage areas including access via electronic mail.

24 Claims, 8 Drawing Sheets

OTHER PUBLICATIONS

World Wide Web Distributed Authoring and Versioning: Web DAV, Whitehead, E.J., WebDAV Information, Feb. 1999, pp. 1–2.

Requirements for Distributed Authoring and Versioning on the World Wide Web, Slein, J.A.; Vitali, F.; Whitehead, Jr., E.J.; Durand, D.G.; Standard View VI. 5, No. 1, Mar. 1997, ISSN: 1067–9936, pp. 17–24.

How to implement Web–based groupware systems based on WebDAV, Dridi, F.; Neumann, G., Enabling Technologies: Infrastructure for Collaborative Enterprises, Jun. 1999, Proceedings IEEE $8^{th}$, ISBN: 0–7695–0365–9, pp. 114–119.

Open Door Networks Introduces New Products for Appleshare Servers, pp. 1–2, Sep. 1997.

ShareWay IP 2.0, pp. 1–2, Feb. 1997.

Open Door Network Products Enhance MAC OS 8, p. 1, Aug. 1997.

U.S. patent application entitled, "Method and System for Seamless Access to a Remote Storage Area," Ser. No. 09/501,041, filed Feb. 9, 2000.

U.S. patent application entitled, "Remote Storage Area Having Multiple Access Interfaces," Ser. No. 09/500,868, filed Feb. 9, 2000.

International Search Report from Application No. PCT/US 01/04352 mailed Oct. 9, 2003 (3 pages).

http://www.webdav.org—WebDAV Resources, pp. 1–3, printed Jun. 15, 2000.

http://www.backup.com—@ Backup®, p. 1, printed Jun. 15, 2000.

http://www.bitlocker.com—Bitlocker, p. 1, printed Jun. 15, 2000.

http://www.datahubonline.com—datahubonline.com, p. 1, printed Jun. 15, 2000.

http://www.diskonnet.com—DiskOnNet.com, p. 1, printed Jun. 15, 2000.

http://www.docspace.com—Critical Path Inc., p. 1, printed Jun. 15, 2000.

http://www.driveway.com—Driveway Corporation, p. 1, printed Jun. 15, 2000.

http://www.itools.mac.com—Apple—iTools, p. 1, printed Jun. 15, 2000.

http://www.filemonkey.com—File Monkey Software Development Services, p. 1, printed Jun. 15, 2000.

http://www.freedrive.com—FreeDrive, Inc, p. 1, printed Jun. 15, 2000.

http://www.xinet.com—Xinet, Inc., p. 1, printed Jun. 15, 2000.

* cited by examiner

500

AppleScript Example:

On adding contents to folder this folder
Set folder_content to the contents of
    this folder
Set the selected_SiLO_directory to the
    comments of this folder
Tell application "SiLO access layer"
Activate
Upload folder_content to the
    selected_SiLO_directory
End tell

FIG. 5

METHOD AND SYSTEM FOR ACCESSING A REMOTE STORAGE AREA

TECHNICAL FIELD

This invention relates to storage of digital data, and more particularly to a data storage system that provides access to a remote storage area.

BACKGROUND

The Internet is a worldwide collection of networks that spans over 100 countries and connects millions of computers. Reports indicate that the Internet is growing faster than all preceding information technologies including radio and television. Remote data storage over the Internet is one of the fastest growing facets of the Internet. Numerous companies provide a wide range of an Internet data storage services for remotely storing and managing data files. Many of these services, however, have limited modes for accessing the data files. For example, many require that a user load proprietary software on his computer in order to communicate data files to the remote storage. Other services only support access via a web browser or similar communication utility.

SUMMARY

The present invention is directed to a data storage system and method capable of providing a variety of access methods. In one embodiment, a data storage system includes a plurality of storage servers coupled to a plurality of storage devices. The storage devices provide a plurality of virtual storage areas and each virtual storage area is assigned to a user. According to the invention, the assigned user can easily access the assigned virtual storage area using a client computer communicatively coupled to the storage servers via a global computer network such as the Internet. More specifically, in order to store data files within the remote virtual storage area, the user sends an electronic mail message that includes the data file as well as user information and target data file information. The storage server parses the electronic mail message and stores the data file within the storage area according to the target data file information. In addition, the user can request one or more data files from the storage area and electronically mail the data files to the user. In this manner, authorized users can easily store date files to or retrieve data files from his or her remote storage area from anywhere in the world via a global computer network such as the Internet or a private wide-area network. The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 illustrates an example operating system script written in AppleScript for the Macintosh& operating system that automatically copies a file from a local directory to a similarly named remote directory located within a storage area;

DETAILED DESCRIPTION

In the following detailed description, references are made to the accompanying drawings that illustrate specific embodiments in which the invention may be practiced. Electrical, mechanical, programmatic and structural changes may be made to the embodiments without departing from the spirit and scope of the present invention. The following detailed description is, therefore, not to be taken in a limiting sense and the scope of the present invention is defined by the claims.

The detailed description is divided into three sections. The first section provides definitions for various terms used throughout the detailed description. The second section describes an exemplary hardware and operating environment in conjunction with which embodiments of the invention can be practiced. Finally, the third section describes various systems, methods, potential benefits and alternative embodiments of the invention.

Definitions

File Transport Protocol (FTP)—A networking protocol specifically for transporting files from one computer on the network to another.

HyperText Markup Language (HTML)—an authoring language that defines the syntax and semantics used to create documents on the World Wide Web.

Internet—a worldwide collection of networks that spans hundreds of countries and connects millions of computers. p0 Internet Protocol (IP)—A low level communications protocol that specifies the format of individual communication packets and an addressing scheme.

Redundant Array of Independent Disks (RAID)—A high-volume storage device having multiple storage drives and fault recovery procedures.

Server Message Block (SMB)—a message format used by to share files, directories and devices.

Transmission Control Protocol (TCP)—a higher-level network communication protocol that establishes a virtual connection between a destination and a source.

Transmission Control Protocol/Internet Protocol(TCP/IP)—the suite of network communications protocols including both TCP and IP.

Web Distributed Authoring and Versioning (WebDAV) is a set of extensions to the Hypertext Transfer Protocol (HTTP) that seeks to make the World Wide Web a collaborative, writeable medium.

World Wide Web (WWW)—A system of Internet servers that support documents specially formatted in the HTML language that supports links to other documents, as well as graphics, audio, and video files.

An Exemplary Operating Environment

Figure 1:
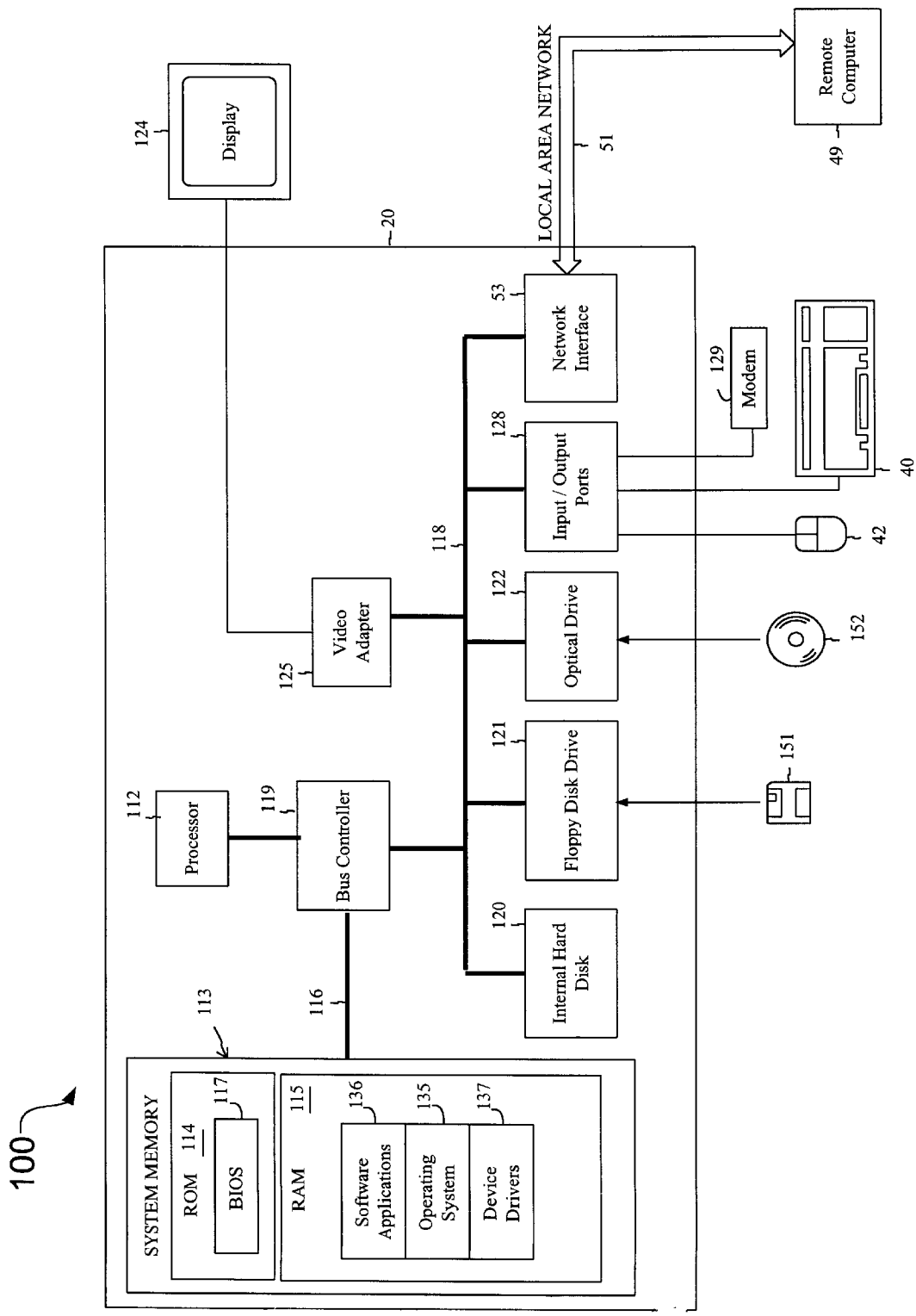
FIG. 1 is a diagram showing an exemplary hardware and operating environment of a suitable computer for use with embodiments of the invention.

FIG. 1 illustrates a computer 100 suitable for supporting the operation of an embodiment of the present invention. As shown in FIG. 1, the computer 100 includes a processor 112 that in one embodiment belongs to the PENTIUM® family of microprocessors manufactured by the Intel Corporation of Santa Clara, Calif. However, it should be understood that the invention can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. Computer 100 represents any server, personal computer, laptop or even a battery-powered, pocket-sized, mobile computer known as a hand-held PC or personal digital assistant (PDA).

Computer 100 includes system memory 113 (including read only memory (ROM) 114 and random access memory (RAM) 115), which is connected to the processor 112 by a system data/address bus 116. ROM 114 represents any device that is primarily read-only including electrically erasable programmable read-only memory (EEPROM), flash memory, etc. RAM 115 represents any random access memory such as Synchronous Dynamic Random Access Memory.

Within the computer 100, input/output bus 118 is connected to the data/address bus 116 via bus controller 119. In one embodiment, input/output bus 118 is implemented as a standard Peripheral Component Interconnect (PCI) bus. The bus controller 119 examines all signals from the processor 112 to route the signals to the appropriate bus. Signals between the processor 112 and the system memory 113 are merely passed through the bus controller 119. However, signals from the processor 112 intended for devices other than system memory 113 are routed onto the input/output bus 118.

Various devices are connected to the input/output bus 118 including hard disk drive 120, floppy drive 121 that is used to read floppy disk 151, and optical drive 122, such as a CD-ROM drive that is used to read an optical disk 152. The video display 124 or other kind of display device is connected to the input/output bus 118 via a video adapter 125.

A user enters commands and information into the computer 100 by using a keyboard 40 and/or pointing device, such as a mouse 42, which are connected to bus 118 via input/output ports 128. Other types of pointing devices (not shown in FIG. 1) include track pads, track balls, joy sticks, data gloves, head trackers, and other devices suitable for positioning a cursor on the video display 124.

As shown in FIG. 1, the computer 100 also includes a modem 129. Although illustrated in FIG. 1 as external to the computer 100, those of ordinary skill in the art will quickly recognize that the modem 129 may also be internal to the computer 100. The modem 129 is typically used to communicate over wide area networks (not shown), such as the global Internet. Modem 129 may be connected to a network using either a wired or wireless connection.

Software applications 136 and data are typically stored via one of the memory storage devices, which may include the hard disk 120, floppy disk 151, CD-ROM 152 and are copied to RAM 115 for execution. In one embodiment, however, software applications 136 are stored in ROM 114 and are copied to RAM 115 for execution or are executed directly from ROM 114.

In general, the operating system 135 executes software applications 136 and carries out instructions issued by the user. For example, when the user wants to load a software application 136, the operating system 135 interprets the instruction and causes the processor 112 to load software application 136 into RAM 115 from either the hard disk 120 or the optical disk 152. Once software application 136 is loaded into the RAM 115, it can be used by the processor 112. In case of large software applications 136, processor 112 loads various portions of program modules into RAM 115 as needed.

The Basic Input/Output System (BIOS) 117 for the computer 100 is stored in ROM 114 and is loaded into RAM 115 upon booting. Those skilled in the art will recognize that the BIOS 117 is a set of basic executable routines that have conventionally helped to transfer information between the computing resources within the computer 100. Operating system 135 or other software applications 136 use these low-level service routines.

In one embodiment computer 100 includes a registry (not shown) which is a system database that holds configuration information for computer 100. For example, Windows® 95 and Windows® NT by Microsoft maintain the registry in two hidden files, called USER.DAT and SYSTEM.DAT, located on a permanent storage device such as an internal disk.

Methods and Systems of the Invention

Figure 2:
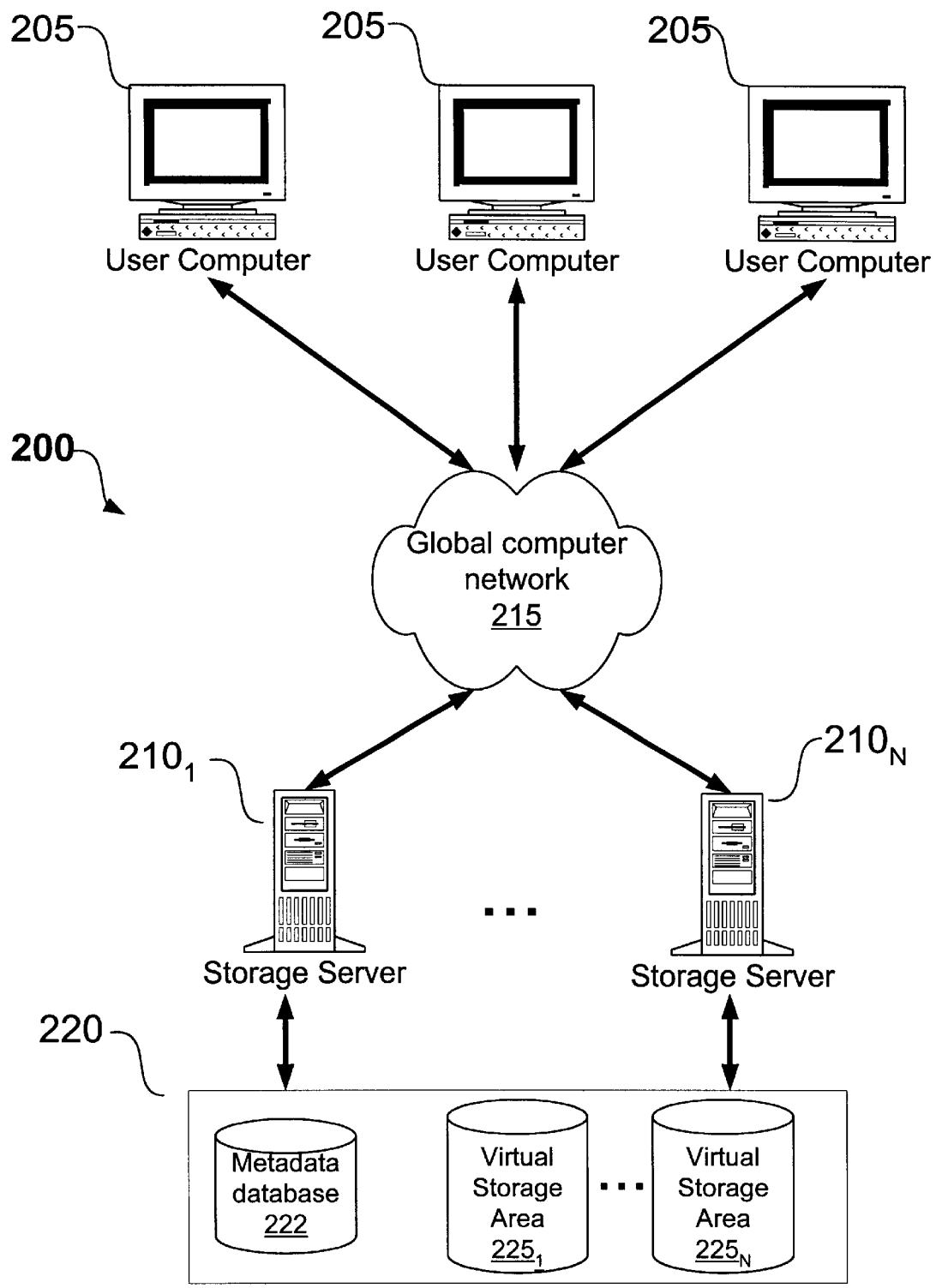
FIG. 2 illustrates one embodiment of a computing system in which a storage server provides seamless access to remote storage areas.

FIG. 2 is a block diagram illustrating one embodiment of a computing environment 200 that provides seamless access to remote storage areas. In the illustrated embodiment, client computers 205 are communicatively coupled to remote storage network 220 via storage servers 210 and global computer network 215 such as the Internet. Storage network 220 represents one or more interconnected storage devices, such as a RAID, for storing data files. The storage network 220 defines a pool of virtual storage areas 225 that can be individually assignable to different users. Initially, a user accesses storage servers 210 via global computer network and requests a virtual storage area 225. For each request, storage server 210 prompts the user for demographic information such as a username, password, billing address, etc. Upon approval, storage network 220 allocates a storage area 225 to the user such that, as described in detail below, the user can remotely access the corresponding virtual storage area via client computers 205. Metadata database 222 stores metadata associated with the data files by the user. Storage server 210 and client computers 205 represent computing devices such as computer 100 described in FIG. 1.

According to various embodiments of the invention, a set of communication software applications execute on storage servers 210 and provide a set of interfaces such that client computers 205 can access virtual storage areas 225 using any one of several different methods. Each method offers different advantages in control, performance and ease of use. For example, in one embodiment, access to the virtual storage areas 225 is fully integrated with operating system 135 executing on each client computer 205. In this embodiment, the user can directly access a virtual storage area 225 via the operating system's user interface. Software applications 136 executing on client computer 205 can access the corresponding virtual storage area 225 through operating system 135 by calling standard file management routines provided by operating system 135. In this embodiment, operating system 135 packetizes data files and metadata received from the management routines and communicates the data to storage servers 210 via network 215. In this embodiment, operating system 135 handles all communication with storage servers 210 such that virtual storage area 225 can be accessed as if it were local to client computer 205.

In another embodiment, the user can access virtual storage area 225 by invoking a communications application 136 such as a web browser or an FTP utility. In this embodiment, the communications application 136 handles communication across network 215. The underlying communications between client computers 205 and storage servers 210 can follow a variety of protocols. Typically, the communications use TCP/IP as a base protocol and additionally use the HTTP protocol, the FTP protocol or even a proprietary data-backup protocol.

The following sub-sections describe the various techniques by which, according to the invention, client computers 205 access virtual storage areas 225 via storage servers 210 and global computer network 215.

Access via the Operating System

According to the invention, in one embodiment, the user can access virtual storage area 225 via operating system 135 in the same manner by which the user accesses local storage devices 120, 121 and 122. In this embodiment, the user interacts with the user interface presented by operating system 135 and manages virtual storage area 225 as if it were a local storage volume. For example, by interacting with operating system 135 the user can perform all common file management tasks including coping files between hard disk 120 and remote storage area 225, as well as renaming and deleting data files. The user is able to browse directory structures within virtual storage area 225 as if it were a local storage volume. Indeed, in some embodiments, virtual storage area 225 may be represented as an icon on the desktop of the user's computer.

Figure 3:
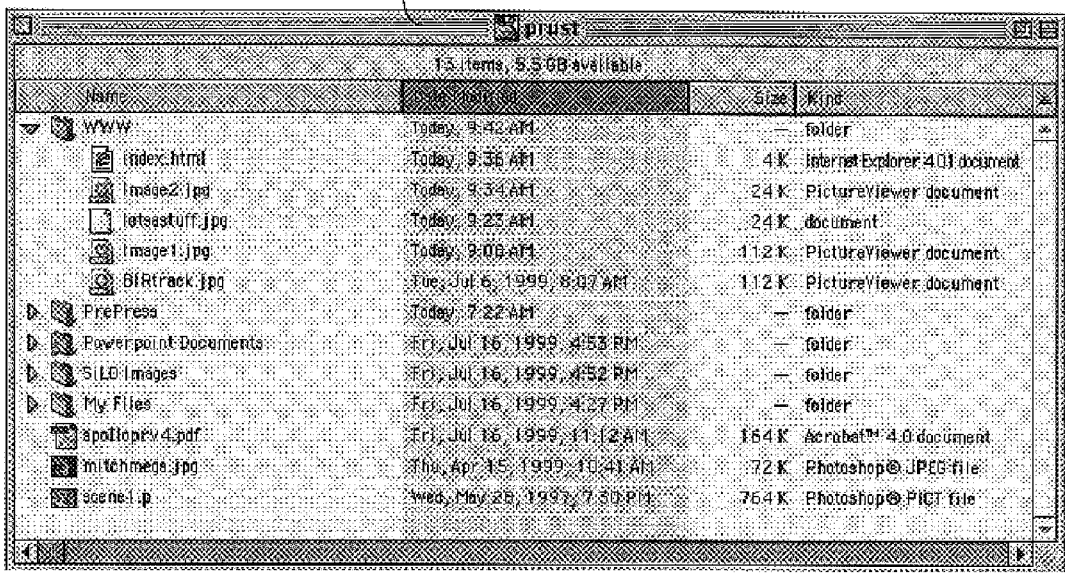
FIG. 3 illustrates a user interface displayed by one embodiment of an operating system for directly accessing a remote storage area using standard file management routines provided by the operating system.

FIG. 3 illustrates window 300 as displayed by operating system 135 for accessing a virtual storage area 225. In the illustrated embodiment, operating system 135 is the Macintosh® operating system from Apple Computer, Inc. Window 300 presented by operating system 135 lists the directories and files of virtual storage area 225 as if the directories and files were local. The user is able to browse the directories within virtual storage area 225 and perform the file management operations supported by operating system 135 such as copying, renaming, moving and deleting files and directories. Similarly, applications 136 executing on client computer 205 access virtual storage area 225 through standard file management routines provided by an application programming interface (API) of operating system 135. In one embodiment, operating system 135 of client computers 205 is the Macintosh operating system, such that the API includes the Apple File Services (AFS), and storage servers 225 are support accessing remote data files within storage area virtual 225 via the Apple Filing Protocol (AFP) services over TCP/IP.

Figure 4:
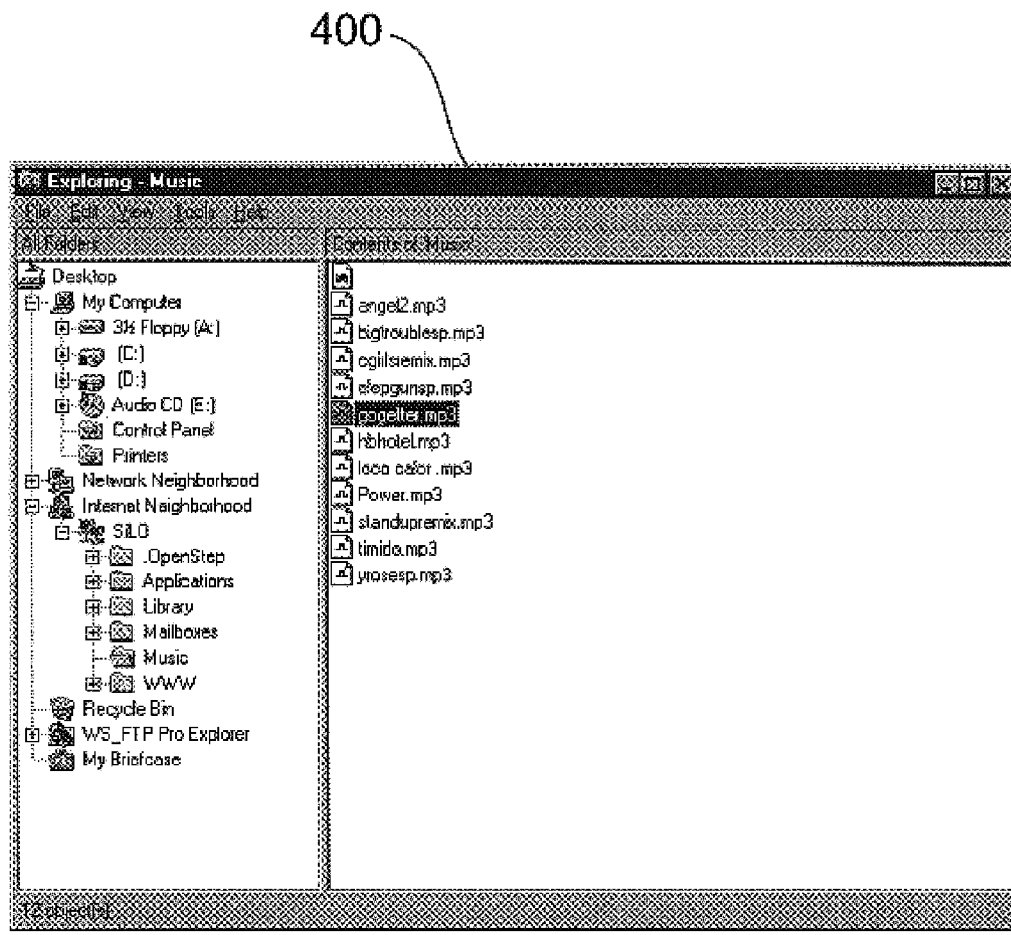
FIG. 4 illustrates a user interface displayed by another embodiment of an operating system for directly accessing a remote storage area.

FIG. 4 illustrates another embodiment in which operating system 135 is the Windows® operating system from Microsoft. Here, operating system 135 displays window 400 that presents an integrated list of those files and directories that are available locally as well as those available from virtual storage area 225. In this embodiment, operating system 135 incorporates the SMB protocol or the WebDAV protocol in order to provide seamless access to virtual storage area 225.

One particular advantage of this embodiment is that software applications 136 executing on computer 100 can access virtual storage area 225 without modification. Because operating system 135 provides seamless access to virtual storage area 225 via conventional file management routines, software applications 136 treat virtual storage area 225 as if it were a local storage volume. Another advantage is that the user can write scripts for operating system 135, such as an OSAX AppleScript for the Macintosh® operating system, in order to control access to virtual storage area 225. FIG. 5 illustrates an operating system script 500 written in AppleScript that automatically copies a file from a local directory to a similarly named remote directory located within virtual storage area 225.

According to one aspect of the invention, the user can associate metadata with each data file as the data file is uploaded to remote storage areas 225 in order to facilitate the quick cataloging and quick retrieval of the data file. Operating system 135 captures the metadata from the user via an input form and communicates the metadata to storage servers 210.

Direct Access From a Communication Software Application

In some embodiments, the user can invoke conventional communication applications and utilities such as a web browser, an FTP utility, a data storage backup utility, or even a conventional email software application, to access virtual storage area. During this method of access, the communication software application 136 handles all communications with storage servers 210. The file management routines of operating system 135 are not invoked. In addition, the communication software 136 is responsible for capturing the metadata from the user and communicating the metadata to storage servers 210 for storage within metadata database 222.

Figure 6:
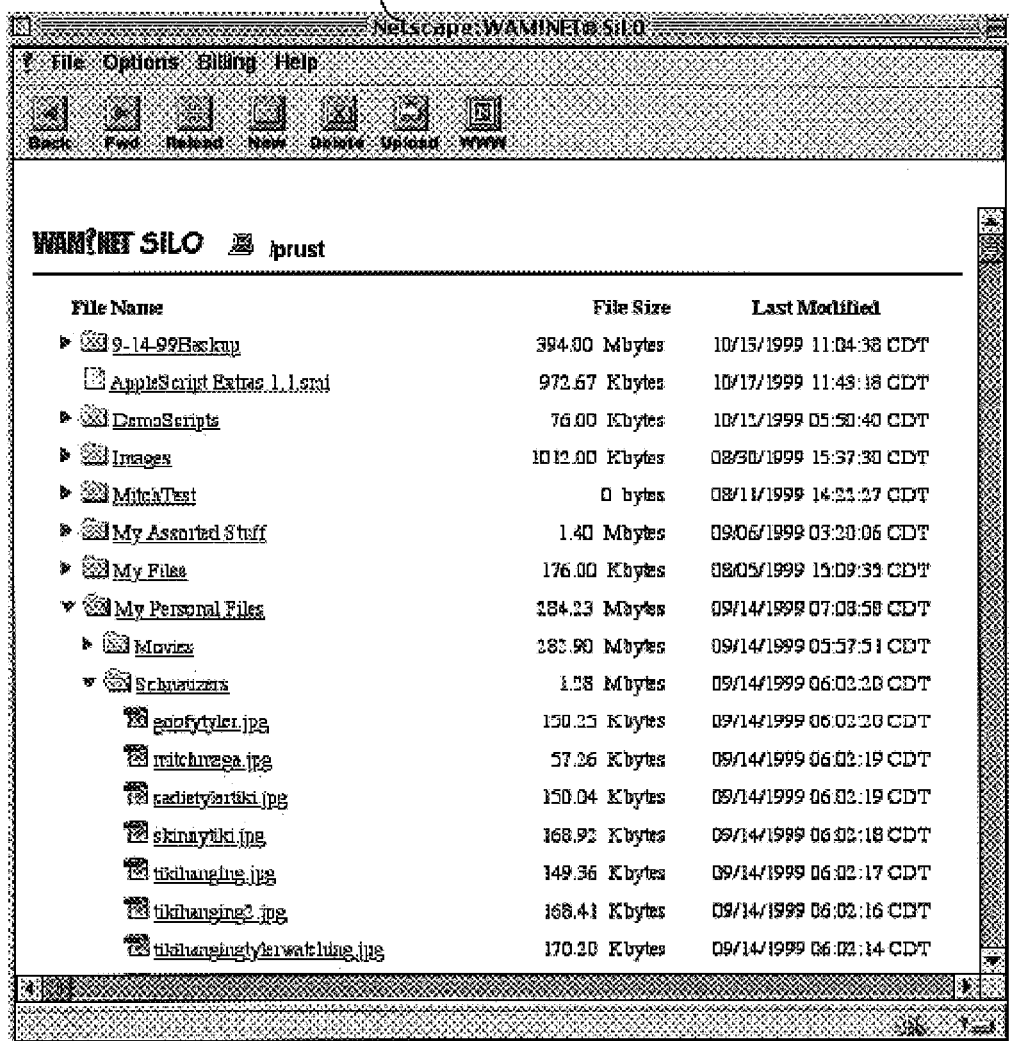
FIG. 6 illustrates a window displayed by a conventional web browser when a user accesses a virtual storage area.

FIG. 6 illustrates the user accessing one of the virtual storage areas 225 via a conventional web browser executing on client computer 205. The web browser displays window 600 that lists each directory within virtual storage area 225. Storage servers 210 maintain a set of image icons for representing the stored data file according to file and creator type information. Storage servers 210 select and display an appropriate icon as a function of the file and creator information stored within virtual storage area 225. Window 600, therefore, closely resembles windows 300 and 400 as displayed by operating system 135. Using the browser, the user can browse the directories within virtual storage area 225 and can perform many common file management operations including uploading, downloading and deleting files, as well as creating and removing directories.

Figure 7:
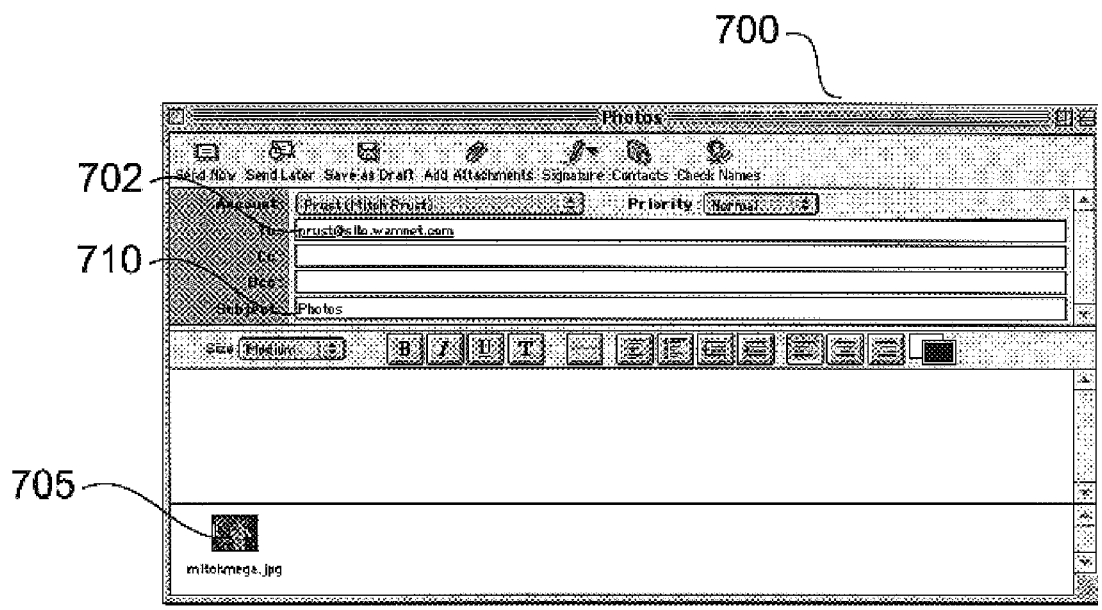
FIG. 7 illustrates a window displayed by a conventional electronic mail software application when a user mails one or more data files to a corresponding storage area.

FIG. 7 illustrates the user accessing virtual storage area 225 using a conventional electronic mail software application 136. Electronic mail software application 136 displays window 700 by which the user creates an email message having user information 702 and target data file information 710. The user addresses the email to his or her email address at storage servers 210. For uploading files, as displayed in window 700, the user attaches one or more data files 705. Upon receiving the email, storage server 210 parses the user information 702 and the target data file information 710 in order to extract one or more target directories. Thus, user information 702 may take the form of a destination electronic mail address, while target data file information 710 may take the form of text in the subject field of an electronic mail message. Storage server 210 stores attached files 705 to the target directory within the appropriate virtual storage area 225 assigned to the user. In this manner, the user is able to email one or more files directly into a specified directory within virtual storage area 225 from any remote location via network 215. In an alternative embodiment, the user does not attach a data file but includes within the electronic mail message a universal resource locator (URL) that indicates where storage server 210 can retrieve the data file to be stored. In order to retrieve one or more data files from storage server 210, the user sends a similar email requesting one or more target data files. In response, storage server 210 sends the user a response electronic mail message with the requested data files attached. In one embodiment storage server 210 temporarily places received data files in a holding area until the user access storage server and selectively authorizes the storage of each data file to his or her virtual storage area. Files that were not authenticated within a predetermine period of time, such as ten days, can be deleted from the holding area.

Remote Processing via Centrally Hosted Applications

The above sections described how, according to the invention, client computers 205 access virtual storage area 225 for remote data storage. The invention, however, is not limited to data storage. According to one aspect of the invention, client computers 205 communicate data files to storage servers 210 for remote processing by one or more applications executing on storage servers 210. For example, the communicated data files may be electronic images such that applications executing on storage servers 210 perform color correction, color proofing and other prepress operations. Other examples include data conversion, compression, decompression, encryption and decryption. As such, a user is able to submit data files for remote processing by simply instructing operating system 135 to copy the data files to a designated directory within virtual storage area 225. As such, this operation can be performed by simply dragging and dropping the file onto the appropriate window presented by operating system 135.

Allocation of a Remote Storage Area

Figure 8:
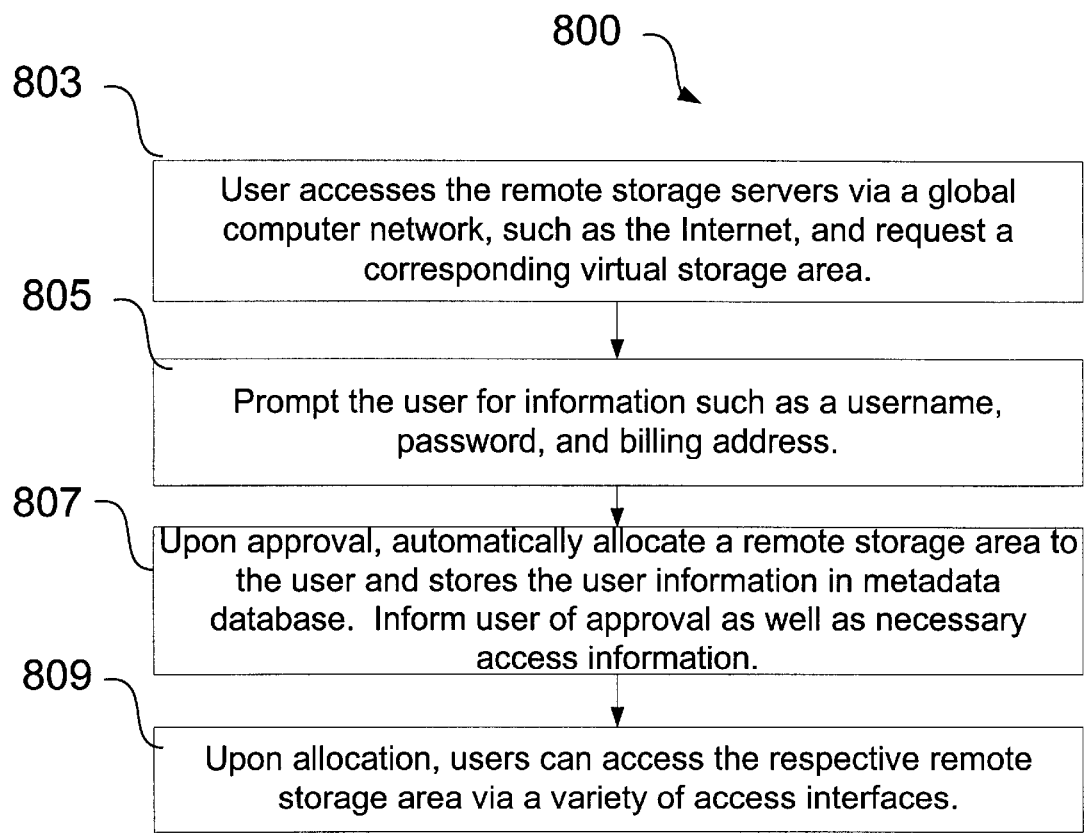
FIG. 8 is a flow chart 800 providing a high-level overview of one mode of operation in which storage network 220 allocates storage areas.

FIG. 8 is a flow chart 800 that provides a high-level overview of one mode of operation in which storage network 220 allocates remote storage areas 225. In block 803, users access storage servers 210 via global computer network 215 and request a corresponding virtual storage area 225. For each request, storage server 210 prompts the user for information such as a username, password, billing address (block 805). Upon approval, storage network 220 automatically allocates a corresponding storage area 225 for each user and stores the respective user information in metadata database 222 (block 807). After a virtual storage area 25 has been allocated, storage network 220 informs each user of any necessary access information, such as a password, so that the user can access the respective storage area 225 via the many access interfaces described above (block 809).

Various embodiments have been described of a method and system for a data storage system that provides seamless access to remote virtual data storage areas via a global computer network. Access to the virtual storage area is fully integrated with the operating system executing on the client computer such that the user, or software applications executing on the computer, can seamlessly access the corresponding virtual storage area using standard file management routines provided by the operating system. In addition, the invention provides a wide range of other remote access methods to the virtual data storage areas including access via electronic mail. This application is intended to cover any adaptation or variation of the present invention. It is intended that this invention be limited only by the claims and equivalents thereof.

What is claimed is:

1. A method for accessing a network-based data storage system that provides seamless access to a plurality of user-assigned storage areas, the method comprising:

presenting a plurality of access interfaces to the user-assigned storage areas via a plurality of software applications executing on a storage server of the data storage system;

servicing access requests from an operating system of a client computer with a first one of the access interfaces to provide access to a target one of the plurality of user-assigned storage areas, wherein the operating system of the client computer includes application programming interface (API) routines that present the target one of the plurality of user-assignable storage areas to software applications executing on the client computer as local to the client computer;

servicing access requests from at least one communication software application executing on the client computer with a second one of the access interfaces to provide access to the target one of the plurality of user-assigned storage areas; and processing an electronic mail message with a third one of the access interfaces to provide access to the target one of the plurality of user-assigned storage areas.

2. The method of claim 1, wherein the electronic mail message contains text and one or more attached data files, and processing the electronic mail message comprises:

parsing the text to determine the target one of the user-assigned storage areas; and storing the data files within the target one of the user-assigned storage areas.

3. The method of claim 2, further comprising analyzing content of a subject field associated with the electronic mail message to determine the target one of the user-assigned remote storage areas.

4. The method of claim 2, further comprising analyzing both content of a subject field associated the electronic mail message and content of a destination address associated with the electronic mail message to determine the target one of the user-assigned remote storage areas.

5. The method of claim 2, further comprising analyzing the electronic mail message to identify a user associated with the electronic mail message and the target one of the user-assigned remote storage areas.

6. The method of claim 5, and further including retrieving security information from the electronic mail message in order to authenticate the user.

7. The method of claim 6, wherein the security information is a digital signature.

8. The method of claim 5, wherein storing the data file within the target one of the user-assigned remote storage areas includes storing the data file into a temporary holding area until the user associated with the remote storage area approves the copying of the data file to the remote storage area.

9. The method of claim 1, wherein communicating the electronic mail message includes encrypting the data file.

10. A data storage system comprising:

a storage server that maintains a plurality of remote storage areas; and a plurality of software applications executing on the storage server to provide a plurality of different access interfaces for accessing the remote storage areas, wherein the plurality of access interfaces comprise:

a first access interface to provide access to a target one of the plurality of remote storage areas in response to access requests from a client computer in which an operating system of the client computer includes application programming interface (API) routines that present the target one of the plurality of remote storage areas to software applications executing on the client computer as local to the client computer, and a second access interface operable to receive an electronic mail message that contains at least one attached data file, analyze the electronic mail message to identity the target one of the plurality of remote storage areas, and store the attached data file within the identified target one of the plurality of remote storage areas.

11. The data storage system of claim 10, wherein the electronic mail message includes text and the second access interface parses the text to determine the target one of the plurality of remote storage areas.

12. The data storage system of claim 10, wherein second access interface analyzes content of a subject field associated with the electronic mail message to determine the target one of the plurality of remote storage areas.

13. The data storage system of claim 10, wherein the second access interface analyzes both content of a subject field associated the electronic mail message and content of a destination address associated with the electronic mail message to determine the target one of the plurality of remote storage areas.

14. The data storage system of claim 10, wherein the second access interface analyzes the electronic mail message to identify a user associated with the electronic mail message.

15. The data storage system of claim 14, wherein the second access interface retrieves security information from the electric mail message in order to authenticate the user.

16. The data storage system of claim 15, wherein the security information comprises a digital signature.

17. The data storage system of claim 14, wherein the second access interface stores the data file in a temporary holding area until the user associated with the remote storage area approves the copying of the data file to the remote storage area.

18. The data storage system of claim 10, wherein the plurality of access interfaces further comprise a third access interface to service access requests from at least one communication software application executing on the client computer and that bypasses the API of the operating system that present the target one of the plurality of remote storage areas to software applications executing on the client computer as local to the client computer.

19. The data storage system of claim 18, wherein the API supports Web Distributed Authoring and Versioning (WebDAV) and the first one of the access interfaces presented by the software applications executing on storage server supports WebDAV for accessing data files within the remote storage area as if the data files were local.

20. The data storage system of claim 19, wherein the third access interface services access requests to automatically backup files from the client completer to the data storage system without involving the API of the operating system that supports WebDAV for accessing the data files within the target one of the plurality of user-assigned storage areas as if the data files were local.

21. A data storage system comprising:

a storage server that maintains a plurality of remote storage areas associated with respective users; and a plurality of software applications executing on the storage server to provide a plurality of different access interfaces for accessing the remote storage areas, wherein the access interfaces comprise:

a first access interface to provide access to a target one of the plurality of remote storage areas in response to access requests from a client computer in which an operating system of the client computer, wherein the API supports Web Distributed Authoring and Versioning (WebDAV) for accessing data files within the target one of the plurality of user-assignable storage area using extensions to the Hypertext Transfer Protocol (HUP) to present the target one of the plurality of remote storage areas to software applications executing on the client computer as if the data files were local to the client computer, a second access interface to directly service access requests from at least one communication software application executing on the client computer to automatically backup files from the client computer to the data storage system, and a third access interface to allow a web browser executing on the client computer to browse the target one of the plurality of remote storage areas.

22. The data storage system of claim 21, wherein comprising a fourth access interface operable to receive an electronic mail message that contains at least one attached data file, analyze the electronic mail message to identify the target one of the plurality of remote storage areas, and store the attached data file within the identified target one of the plurality of remote storage areas.

23. The data storage system of claim 22, wherein the electronic mail message includes text and the fourth access interface parses the text to determine the target one of the plurality of remote storage areas.

24. The data storage system of claim 23, wherein the fourth access interface analyzes content of a subject field associated with the electronic mail message to determine the target one of the plurality of remote storage areas.

* * * * *

UNITED STATES PATENT AND TRADEMARK OFFICE
CERTIFICATE OF CORRECTION

PATENT NO. : 6,735,623 B1 Page 1 of 1
DATED : May 11, 2004
INVENTOR(S) : Mitch Prust It is certified that error appears in the above-identified patent and that said Letters Patent is hereby corrected as shown below:

<u>Column 9,</u>
Line 16, insert -- the -- after "wherein" and before "second".

<u>Column 10,</u>
Line 3, "completer" should read -- computer --.
Line 4, "involving" should read -- invoking --.
Line 25, "(HUP)" should read -- (HTTP) --.
Line 37, "wherein" should read -- further --.

Signed and Sealed this

Twenty-eighth Day of March, 2006

JON W. DUDAS
*Director of the United States Patent and Trademark Office*